G. L. Smith.
Furnace Grates.
No. 3,644. Reissued Sept. 21, 1869.
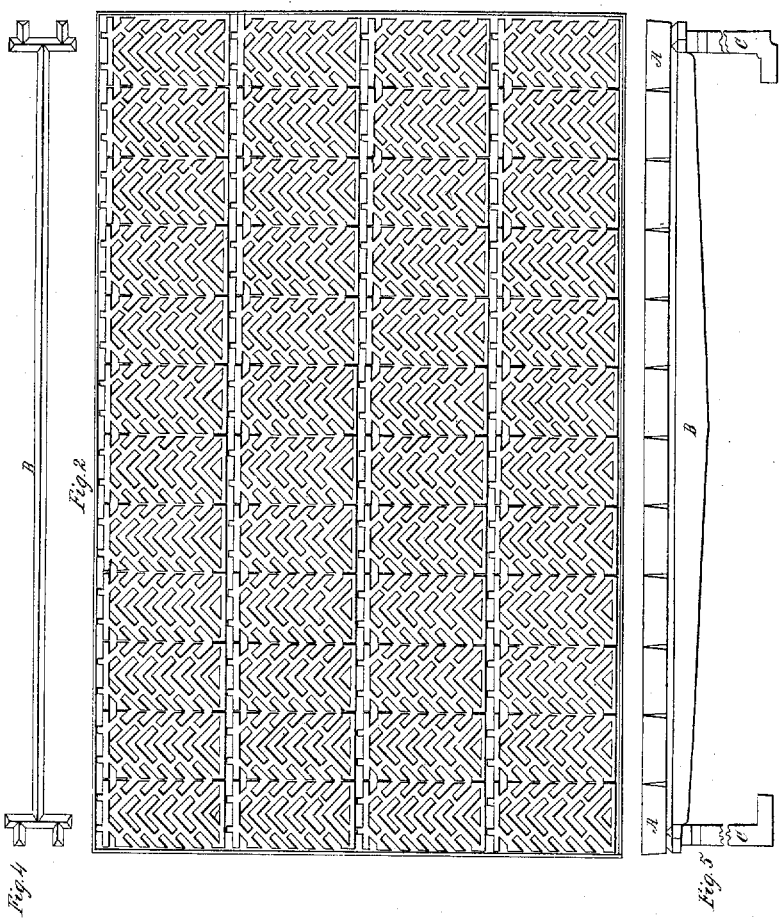
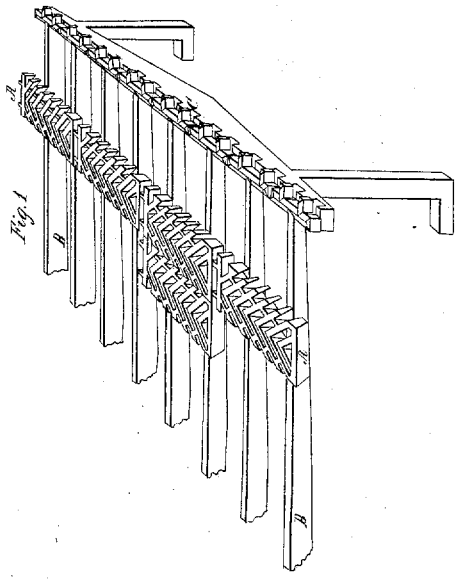
Witnesses;
A. J. Rowley
C. C. Grant
Inventor;
Geo. L. Smith
N. PETERS, PHOTO-LITHOGRAPHER, WASHINGTON, D. C.

United States Patent Office.

GEORGE L. SMITH, OF BROOKLYN, NEW YORK.

*Letters Patent No.* 42,118, *dated March* 29, 1864; *reissue No.* 3,644, *dated September* 21, 1869.

IMPROVEMENT IN GRATES.

The Schedule referred to in these Letters Patent and making part of the same.

*To all whom it may concern:*

Be it known that I, GEORGE L. SMITH, of Brooklyn, in the county of Kings, and State of New York, have invented a new and improved Grate for Boilers and other Furnaces; and that the following is a full and exact description thereof, reference being had to the accompanying drawings, and to the letters of reference marked thereon.

Figure 1 is a perspective sectional view of the supporting and bearing-bars requisite for a boiler-furnace, and also of a section of my improved grates located in position upon the same;

Figure 2 is a plan view of a "set" of grates as placed for use;

Figure 3 is a transverse longitudinal section of fig. 2; and

Figure 4 is a plan view of the bearing-bar B, which is made Λ-shape in its upper face, so that the passage of air to the grate resting upon it shall be unobstructed.

Great difficulty has heretofore existed in forming and maintaining level and uniform surfaces of the grates (and air-passages in the same) of steam-boiler and other furnaces, and a great variety of grate-bars, both single and in sections or clusters of more than one, has been used.

It is well known that equal temperature in any given piece of metal, in its various parts, produces equal expansion and contraction in the same, without strain in any part, while unequal temperatures applied to the same piece of metal, in its various parts, produces great strain, and often produces fractures, and always tends to spring or warp it out of shape. This principle applies to the grates of steam-boiler and other furnaces.

My invention aims to overcome all these objections—

First, by forming the air-passages, or openings through the grate, in the form shown in the attached drawing, so that the slice-bar, in passing over the openings, shall have a shearing or cutting-action against the clinkers or cinders lying over or upon, or which project down into the openings, tending to crush and remove more speedily than if the openings were parallel to or transverse to the line of depth of furnace.

Second, by forming such grate, fig. 2, in small sections, such small sections or blocks having air-spaces through them, formed obliquely or zigzag, as shown, and of uniform size, either square or oblong, or other shape, that will, when fitted together, form a continuous grate-surface, and that each section or block will be, in all its parts, subjected substantially to a uniform or even temperature, and thus remove or diminish the tendency in the metal to warp or spring out of true.

In case of the destruction or failure of the portion of them subjected to the most intense heat, they can be replaced at small expense and little time.

By thus forming the grate in sections, and at the same time so forming the openings for the passage of air through them to the fire, the said openings effect the double object of giving increased area for the admission of air, and of giving increased opportunity of clearing the surface from cinders and clinkers by the use of the slice-bar.

The advantage of my invention lies in the greater ease and facility of removing the cinder and clinker from the grate-surface, by the shearing-like action of the slice-bar or hoe, due to the diagonal or angular openings.

Fig. 2, in the accompanying drawings, shows the exact form and proportion I consider preferable, and have adopted.

A A are the small grates, as described;

B B are longitudinal bearers supporting A A; and

C C is the ordinary grate-bar bearer, supporting the whole.

I will designate the several portions of my castings A as follows:

The angular or V-shaped parts along the central portion of each section are marked *a;*

The corresponding angular or V-spaces between them are marked *m;* and

The several pieces which join these near each side are marked $a^1$ and $a^2$.

The openings *m* being V-shaped, allow the corresponding parts *a* to expand and contract, without distorting the general shape.

An expansion in any portion only results in making the V-shape more oblique or more strongly marked.

This change does not alter the general shape or distort in any manner the entire piece of casting.

The arrangement of these apertures *m* is such as throws the angle of all in the same direction, and thus the expansion and contraction move all in the same direction, without involving any appreciable change in the width of the spaces for the air, and prevent fractures of the grate-bar by all strain from expansion being relieved.

I would have it understood that I do not confine myself to the exact proportion of the grate-bars or sections here shown. They may vary in length and width to suit circumstances, and the various sizes and uses of the different furnaces when they may be used.

Having thus fully described my invention,

What I claim as new, and desire to secure by Letters Patent, is as follows:

1. Arranging the air-passages or openings in furnace-grates diagonal or oblique to the length or width of the grate, as shown and described, and for the purpose set forth.

2. The arrangement of the air-passages or openings within furnace-grates oblique to the length or width of the grate, in combination with the constructing of the said grate of a series of sections, substantially as shown and for the purpose described.

In testimony whereof, I have hereunto set my hand, in the presence of two subscribing witnesses.

GEO. L. SMITH.

Witnesses:

W. C. DEY,

F. A. HADICKE.